United States Patent
Nishimura et al.

[19]

[11] Patent Number: 6,055,956
[45] Date of Patent: May 2, 2000

[54] CONTROL SYSTEM FOR AN ENGINE EQUIPPED WITH EXHAUST GAS RECIRCULATION SYSTEM

[75] Inventors: Hirofumi Nishimura; Youichi Kuji, both of Hiroshima, Japan

[73] Assignee: Mazda Motor Corporation, Hiroshima, Japan

[21] Appl. No.: 09/199,452

[22] Filed: Nov. 25, 1998

[30] Foreign Application Priority Data

Sep. 29, 1998 [JP] Japan .................................. 10-274622

[51] Int. Cl.$^7$ ...................................................... F02D 41/02
[52] U.S. Cl. ........................ 123/299; 123/300; 123/480
[58] Field of Search ................................. 123/299, 300, 123/478, 480, 672, 676, 679, 689

[56] References Cited

FOREIGN PATENT DOCUMENTS

| 0919709 | 2/1999 | European Pat. Off. . |
| 0919711 | 2/1999 | European Pat. Off. . |
| 0919712 | 2/1999 | European Pat. Off. . |
| 0919713 | 2/1999 | European Pat. Off. . |
| 0919714 | 2/1999 | European Pat. Off. . |
| 7-119507 | 5/1995 | Japan .............................. F02D 41/02 |
| 7-217478 | 8/1995 | Japan .............................. F02D 41/04 |
| WO 93/07363 | 4/1993 | WIPO ............................... F01N 3/18 |

*Primary Examiner*—Willis R. Wolfe
*Assistant Examiner*—Hieu T. Vo
*Attorney, Agent, or Firm*—Nixon Peabody LLP; Donald R. Studebaker

[57] ABSTRACT

An engine control system for a direct injection-spark ignition type of engine which is equipped with a fuel injector for spraying fuel directly into a combustion chamber and an exhaust system having a lean NOx conversion catalyst for lowering an emission level of nitrogen oxides (NOx) in exhaust gas at an air-fuel ratio of $\lambda>1$ controls divides a given amount of fuel into two parts which are intermittently delivered through early and late split injection respectively in a intake stroke and controls a fuel injector such that a midpoint between points at which the early and late split injection are timed respectively to start is before a midpoint of a intake stroke while the engine is in a lean fuel charge zone.

23 Claims, 13 Drawing Sheets

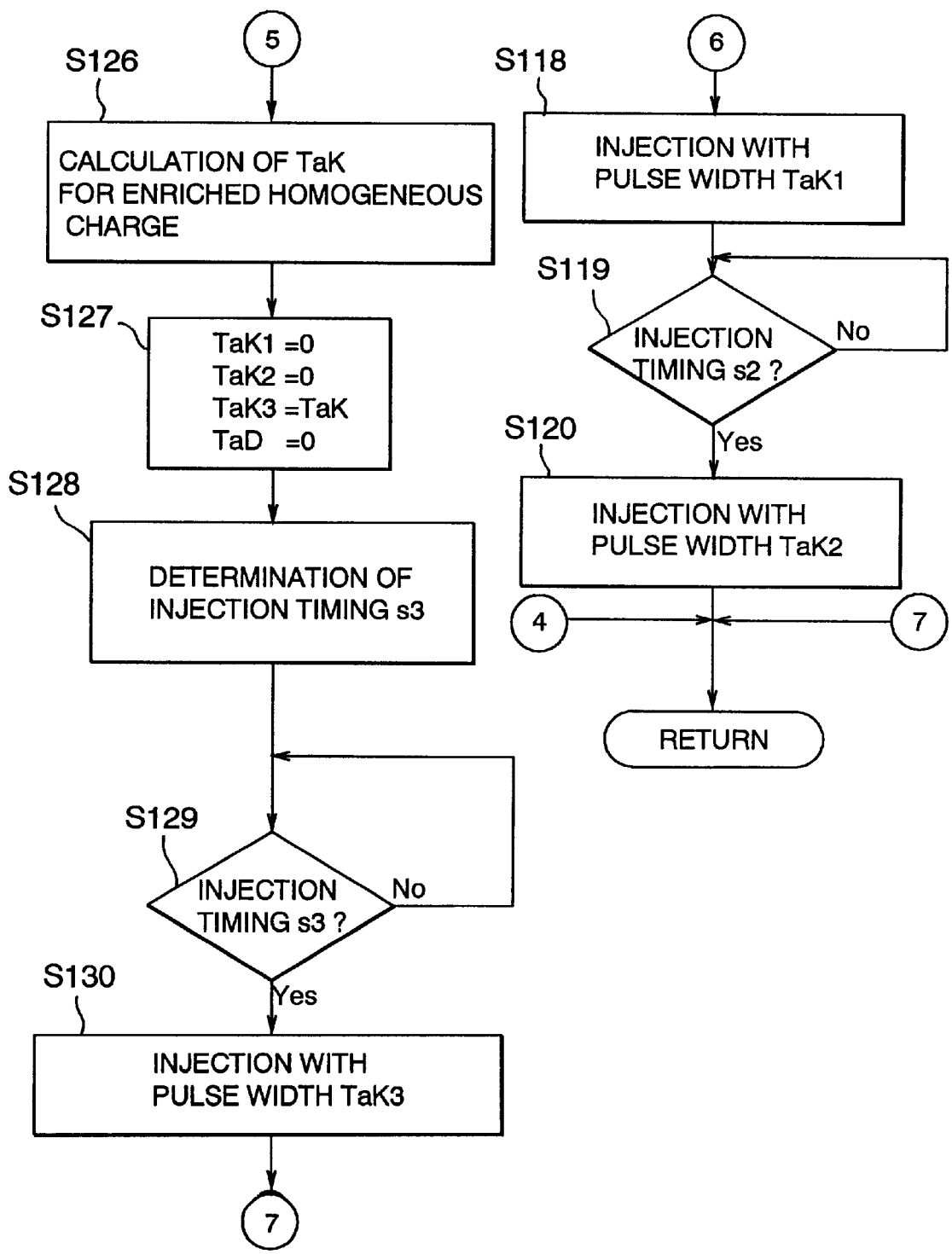

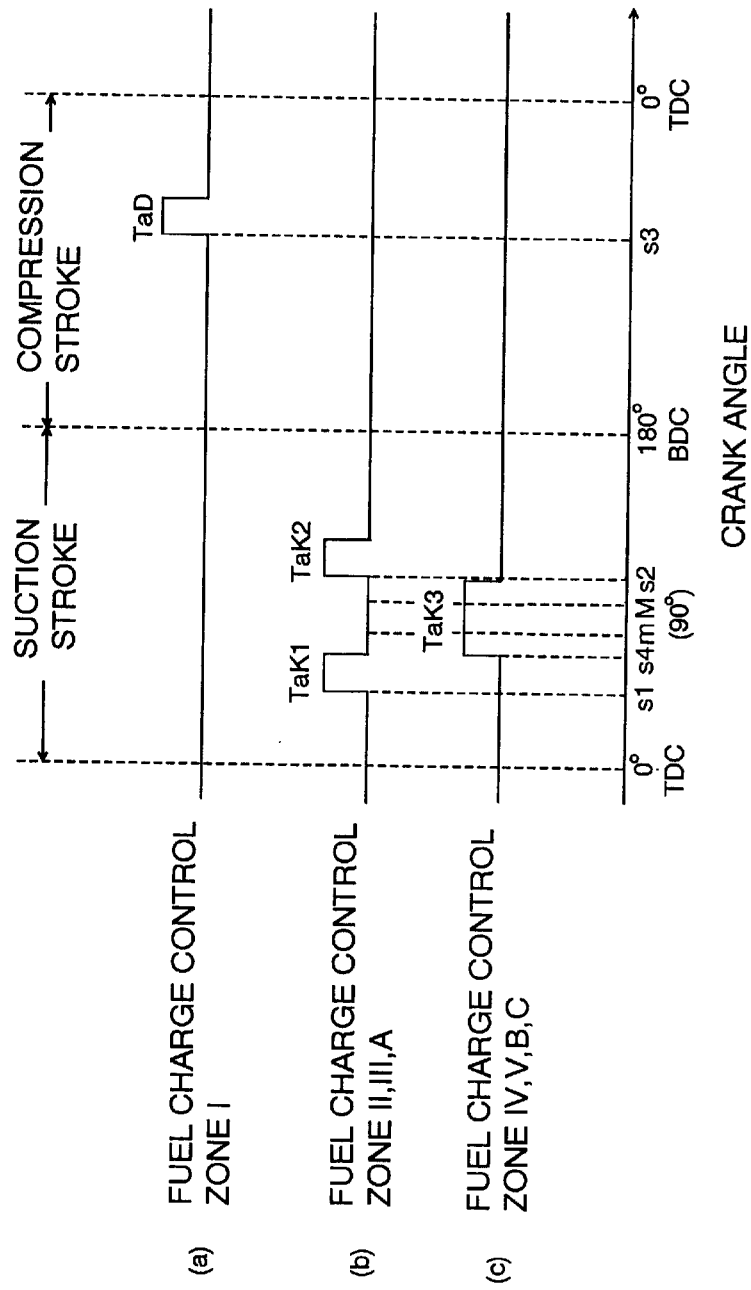

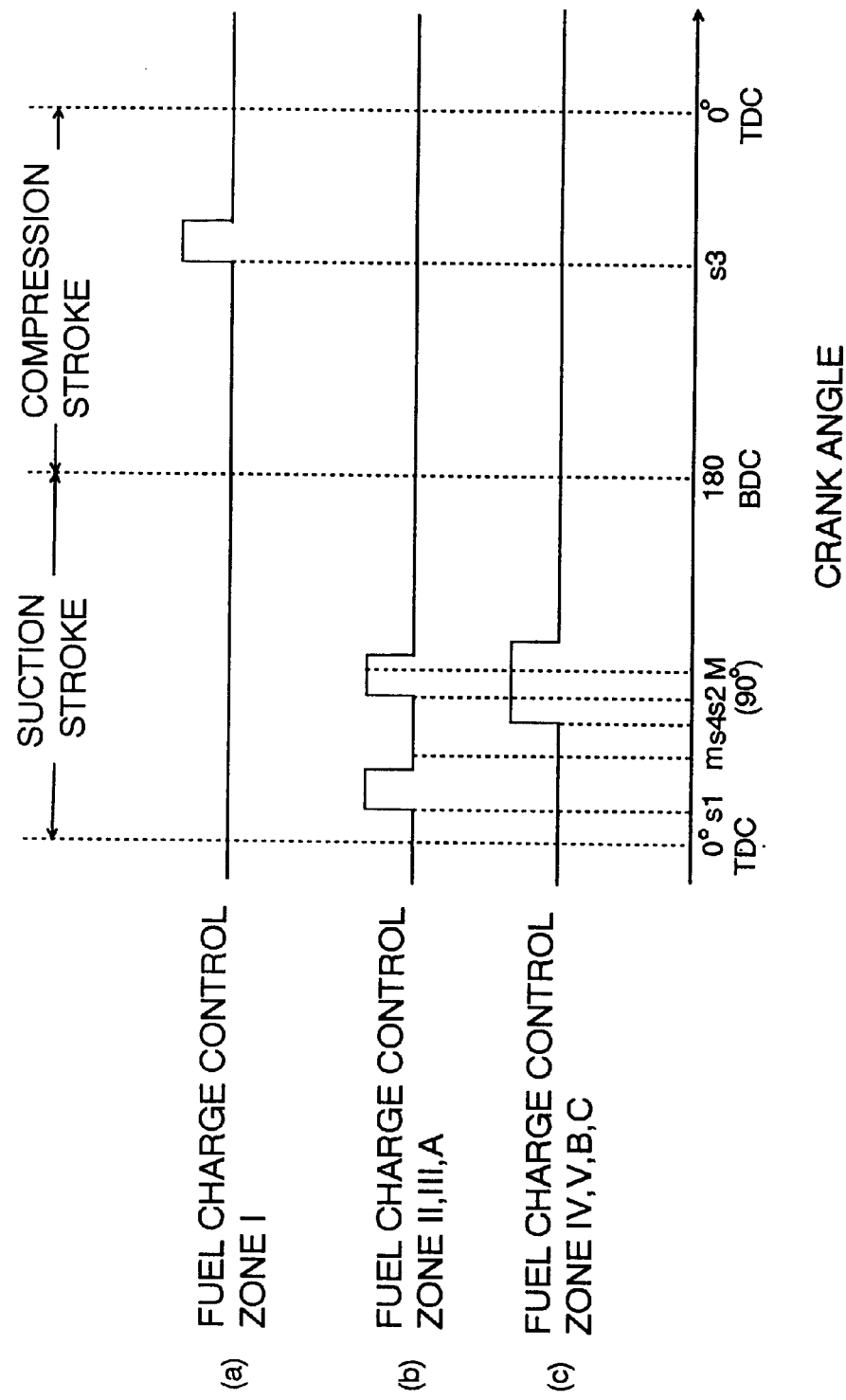

CONTROL SYSTEM FOR AN ENGINE EQUIPPED WITH EXHAUST GAS RECIRCULATION SYSTEM

BACKGROUND OF THE INVENTION

1. Field of the Invention

The invention relates to an engine control system for a direct injection-spark ignition type of engine and, in particular, for a direct injection-spark ignition type of engine equipped with an exhaust gas recirculation system which controls fuel injection timing in an engine operating zone in which the exhaust gas recirculation system is actuated to admit exhaust gas into an intake air stream.

2. Description of the Related Art

Engine control system of this type incorporate in an exhaust line a NOx adsorbing type of lean NOx conversion catalyst which, on one hand, adsorbs NOx in the exhaust gas while the air-fuel mixture is leaner than a stoichiometric mixture and, on the other hand, desorbs or releases the NOx into exhaust gas for catalyzing reduction of the NOx while the air-fuel mixture is richer than a stoichiometric mixture. As is known from, for example, International Patent Application W093/07363, such an engine control system controls the engine to operate with an enriched mixture under accelerating conditions or full loading operating conditions and with a lean mixture under the remaining operating conditions, so as to improve fuel consumption.

An engine control system for a direct injection-spark ignition type of engine known from, for example, Japanese Unexamined Patent Publication 7-119507 controls the engine to cause stratified charge combustion in a lower engine loading zone and homogeneous charge combustion in a high engine loading zone. While the engine operates with lower speeds in the high loading zone, a given amount of fuel is delivered in two steps through early and late split injection in a intake stroke, so as to diffuse a first half of fuel sprayed through the early split injection in the combustion chamber before the end of a intake stroke and the second half of fuel in the combustion chamber with its volume increased, This prevents a generation of rich or dense mixture over the top of a piston in a subsequent compression stroke that generally occurs when a given amount of fuel is sprayed all at once through non-split injection, which is desirable to prevent generation of smoke.

Another engine control system for a direct injection-spark ignition engine cooperates with a fuel injector which is direct to face the top of a piston and energized to spray a small amount of fuel preparatorily at the beginning of a intake stroke when the engine causes knocking. The fuel partly sticks to the top wall of the piston on a side of an intake port and bounces off the piston wall toward the intake port to cool the piston head and the combustion chamber on the intake port side with the heat of vaporization of the fuel. Such an engine control system is known from, for example, Japanese Unexamined Patent Publication 7-217478.

While a lean NOx conversion catalyst disposed in an exhaust line as described in the International Patent Application W093/07363 lowers an emission level of NOx in lean exhaust gas, it shows a catalytic conversion efficiency insufficient as compared with the NOx conversion efficiency of a three-way catalyst at a stoichiometric air-fuel ratio. In particular, a NOx adsorption type of lean NOx conversion catalyst lowers its NOx conversion efficiency due to an increased amount of NOx adsorption resulting from a long time continuous operation of the engine with a lean fuel charge. Accordingly, it is necessary to enrich the fuel charge before a specified amount of NOx adsorption is exceeded. In other words, the engine operation with a lean fuel charge is restrained by the necessity of refreshing the lean NOx conversion catalyst, which is undesirable for fuel consumption.

In order to control the formation of NOx, it has been known to lower the maximum temperature of exhaust gas by recirculating exhaust gas partly into an intake air stream. However, if admitting a large amount of exhaust gas into an intake air stream, drivability is possibly lowered due to an increased combustion change. If controlling the amount of exhaust gas recirculation so as not to exceed a limit for preventing or significantly reducing aggravation of drivability, it is hard to satisfy the demand for lowering the formation of NOx and improving fuel consumption.

SUMMARY OF THE INVENTION

It is an objective of the invention to provide an engine control system for a direct injection-spark ignition type of engine which performs fuel injection in a specific pattern to improve fuel consumption and lower the emission level of NOx by improvement of combustion stability and an expanded limit of exhaust gas recirculation.

The foregoing object of the present invention is achieved by providing an engine control system operative to control fuel injection such that a given amount of fuel is delivered in two parts through early and late split injection in a intake stroke and that the midpoint between points at which the early and late split injection are timed respectively to start is before a midpoint of a intake stroke while exhaust gas is admitted into an intake air stream.

According to a preferred embodiment of the invention, the engine control system cooperates with a direct injection-spark ignition type of engine which is equipped with a fuel injector for spraying fuel directly into a combustion chamber, an intake system and an exhaust system having a lean NOx conversion catalyst for lowering an emission level of nitrogen oxides (NOx) in exhaust gas at an air-fuel ratio of $\lambda>1$ and controls the engine to make stratified charge combustion in a zone of lower engine loadings and homogeneous charge combustion in a zone other than the lower engine loading zone. The engine control system, while the engine is in an engine operating condition in the zone other than the lower engine loading zone and exhaust gas is admitted into an intake air stream, divides a given amount of fuel into two parts which are intermittently delivered through early and late split injection respectively in a intake stroke and controls the fuel injector such that the midpoint between points at which the early and late split injection are timed respectively to start is before the midpoint of a intake stroke.

According to another embodiment of the invention, the engine control system cooperates with a direct injection-spark ignition type of engine which is equipped with a fuel injector for spraying fuel directly into a combustion chamber and an exhaust system having a lean NOx conversion catalyst for lowering an emission level of nitrogen oxides (NOx) in exhaust gas at an air-fuel ratio of $\lambda>1$ and controls the engine to operate with a fuel charge of $\lambda>1$ in a zone of partial engine loadings and with a fuel charge enriched to be $\lambda<1$ in a zone other than the partial engine loading zone. The engine control system, while exhaust gas is admitted into an intake air stream, divides a given amount of fuel into two parts which are intermittently delivered through early and late split injection, respectively, in a intake stroke and controls the fuel injector such that the midpoint between points at which the early and late split injection are timed respectively to start respectively is before the midpoint of a intake stroke.

According to still another embodiment of the invention, the engine control system cooperates with a direct injection-spark ignition type of engine which is equipped with a fuel injector for spraying fuel directly into a combustion chamber and controls an amount of fuel to be delivered through the fuel injector. The engine control system, while exhaust gas is admitted into an intake air stream, delivers a given amount of fuel in two parts intermittently through early and late split injection in a intake stroke and controls the fuel injector such that the midpoint between points at which the early and late split injection are timed respectively to start is before the midpoint of a intake stroke.

With the engine control system, while a part of fuel delivered through the early split injection is sufficiently diffused homogeneously in the combustion chamber whose volume increases as the piston moves down before the late split injection is started, another part of fuel subsequently delivered through the late split injection is diffused and made homogeneous in the combustion chamber whose volume has sufficiently increased. In consequence, a homogeneous fuel mixture is generated in the combustion chamber with an effect of increasing combustion velocity and combustion efficiency in a combustion stroke, providing a drop in exhaust gas temperature. The control in which fuel injection is made such that the midpoint between points at which the early and late split injection are timed respectively to start is before the midpoint of a intake stroke provides various prominent effects described below. On condition that a given amount of fuel has to be injected within an entire intake stroke, the early split injection can be timed to be at a point at which the piston moves down at a relatively high speed, which is accompanied by generation of a strong intake air stream, accelerating accomplishment of a homogeneous distribution of fuel mixture and evaporation of fuel. The early and late split injection is off as one whole to the early side of a intake stroke and, in consequence, fuel delivered through the late split injection sticks to a cylinder wall near when the piston reaches its bottom-dead-center (at the end of a intake stroke), so as to evade tardy accomplishment of a homogeneous distribution of fuel mixture. In addition, there is certainly provided a long period of time allowed for a fuel mixture to evaporate before spark ignition of the fuel mixture and a rise in intake air temperature by recirculated exhaust gas, which are always desirable for acceleration of fuel evaporation. These effects mutually affect one another to produce a greatly improved combustion stability and specific fuel consumption due to a shortened combustion time and a high combustion velocity, increasing greatly the amount of exhaust gas recirculated into the combustion chamber. In consequence, the formation of NOx is more lowered and the specific fuel consumption is improved even more. By admitting exhaust gas into an intake air stream in a lower to middle engine loading zone while the engine is monitored to be in an engine loading zone excepting middle to higher engine loadings, there is no possibility that the drivability is lowered even if the engine encounters aggravation of combustion in the lower to middle engine loading zone, so as to permit a large amount of exhaust gas to be recirculated. It is desirable for providing a sufficient time in which the fuel injection opens to divide a given amount of fuel into two substantially equal parts for the early and late split injection.

The late split injection may be timed to start at a point in one of first and middle divisions of three substantially equal divisions of a intake stroke. Further, the late split injection may be timed to end at a point in one of the first and middle divisions of three approximately equal divisions of a intake stroke while the engine is in a lower speed zone. Because the engine output shaft needs only a short time for one revolution in a middle and higher engine speed zone, it is practically hard to terminate the late split injection at a point in one of the first and middle divisions of a intake stroke.

The midpoint of the late split injection may be timed to be at a point before the midpoint of a intake stroke at which the cylinder piston attains a maximum down speed. In this instance, the late split injection is made when the piston moves down with the highest speed and, in consequence, creates a fast intake air stream by which fuel is homogeneously diffused in the combustion chamber. An air stream control means may be incorporated to create an enhanced an intake air stream with an effect of accelerating accomplishment of a homogeneous distribution of fuel and improving combustion stability.

In order to provide an accelerated homogeneous distribution of fuel in the combustion chamber, the exhaust gas recirculation system may admit exhaust gas with an exhaust gas recirculation ratio of 10 to 40% and/or the fuel injection may be of a type having a spray angle greater than 45°.

BRIEF DESCRIPTION OF THE DRAWINGS

The foregoing and other objects and features of the present invention will be clearly understood from the following detailed description of preferred embodiments when read in conjunction with the accompanying drawings in which:

FIGS. 5(A) through 5(D) are a flow chart illustrating a sequence routine of fuel injection control for a microcomputer of an engine control unit;

FIG. 6 is a time chart of fuel injection for various engine operating zones;

FIG. 8 is another time chart of fuel injection for various engine operating zones;

DETAILED DESCRIPTION OF THE PREFERRED EMBODIMENT

The term "NOx conversion" as used throughout the specification shall mean and refer to a reduction in the NOx content of exhaust gas due such as to NOx adsorption on a NOx adsorbing type of catalyst and reduction of NOx to $N_2$ and $O_2$ by a NOx reduction type of catalyst, and the term "lean NOx conversion catalyst" as used herein shall mean and refer to the type controlling or lowering an emission level of oxides of nitrogen (NOx) in a lean exhaust gas whose air-fuel ratio is $\lambda > 1$.

Because direct injection-spark ignition type of gasoline engine is well known, the present description will be directed in particular to elements forming part of, or cooperating directly with, an engine control system in accordance with the present invention. It is to be understood that elements not specifically shown or described can take various forms well known to those skilled in the automobile art.

Figure 1:
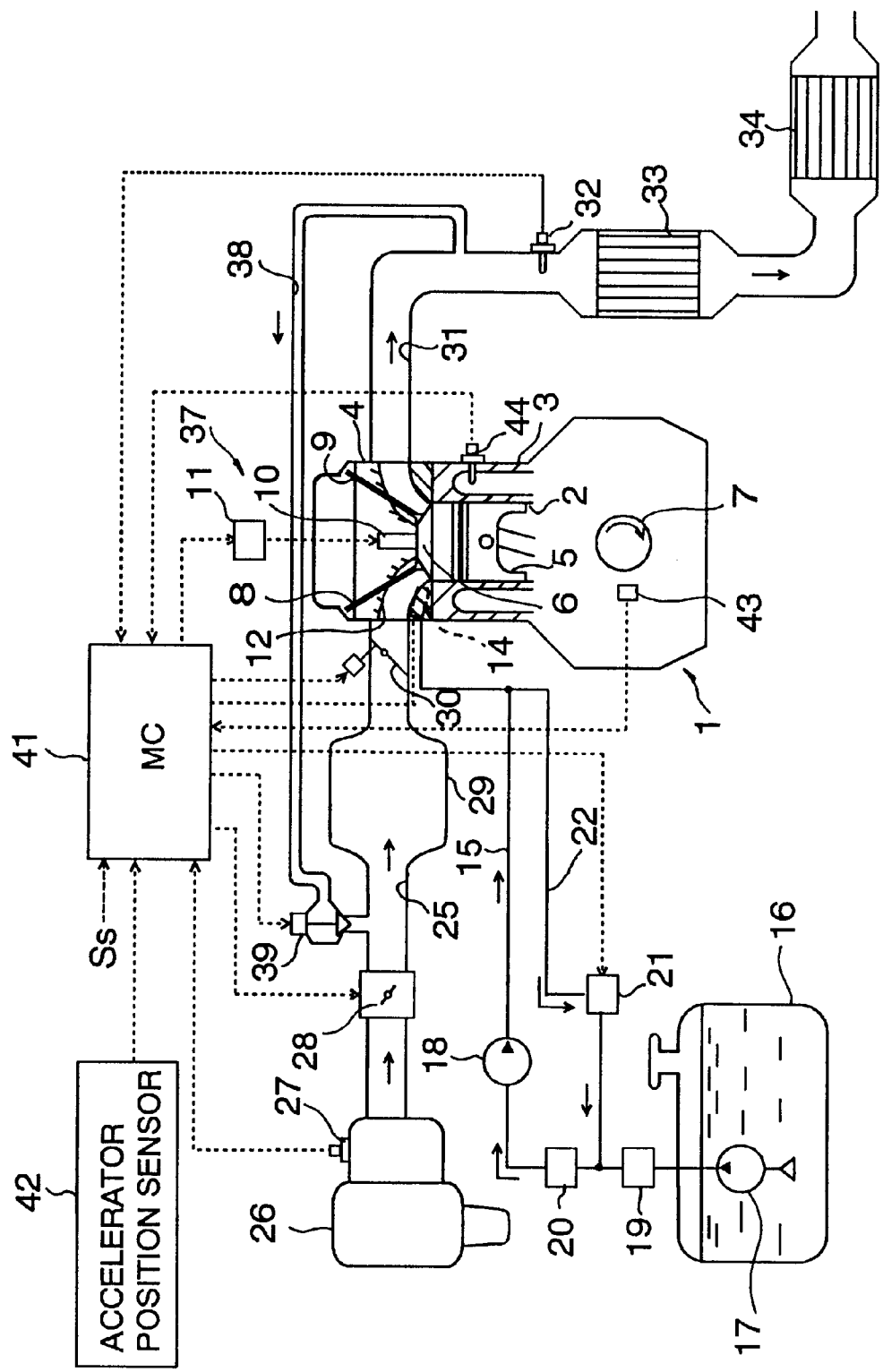
FIG. 1 is a schematic illustration of an engine control system in accordance with an embodiment of the invention.

Referring to the drawings in detail and, in particular, to FIG. 1 showing an engine control system in accordance with an embodiment of the invention, a fuel direct injection type of multiple cylinder engine 1 equipped with exhaust gas recirculation system, which is controlled by the engine control system, is comprised of a cylinder block 3 provided with cylinder bores 2 (only one of which is shown) in which pistons 5 can slide and a cylinder head 4 mounted on the cylinder block 3. A combustion chamber 6 is formed in the cylinder by the top of the piston 5, a lower wall of the cylinder head 4 and the cylinder bore 2. Two intake ports 12 (only one of which is shown) and one exhaust port 13 are opened into the combustion chamber 6, and are opened and shut at a predetermined timing by intake valves 8 and an exhaust valve 9, respectively. A fuel injector 14 is installed into the cylinder head 4 such that a spray of fuel is directly charged into the combustion chamber 6 from the side. The piston 5 at its top cavity (not shown) traps the spray of fuel in a later half of a compression stroke to form a stratum of relatively rich air-fuel mixture near the spark plug 10, so as thereby to form a stratified charge of air-fuel mixture in the combustion chamber 6. The fuel injector 14 has a wide-angle spray nozzle (not shown) having an angle of spray angle greater than 45°, so that a spray of fuel spreads at a wide angle in the combustion chamber 6 to form a homogeneous distribution of air-fuel mixture during a intake stroke. A spark plug 10 is installed in the cylinder head 4 such that electrodes of the spark plug 10 are placed down into the combustion chamber 6 and aligned with the vertical center line of the cylinder and connected to an ignition circuit 11 to ignite an air-fuel mixture in the combustion engine. A fuel line 15, through which the fuel is delivered to the fuel injector 14 from a fuel tank 16 is equipped with two fuel pumps, namely a low pressure fuel pump 17 disposed in the fuel tank 16 and a high pressure fuel pump 18 disposed the outside of the fuel tank 16. The fuel line 15 between the fuel pumps 17 and 18 is further equipped with a low pressure regulator 19 and a fuel filter 20 positioned in this order from the side of fuel tank 16. A fuel return line 22 equipped with a high pressure regulator 21 is connected to the fuel line 15 between a point after the high pressure fuel pump 18 and a point before the fuel filter 20. Fuel is drawn up from the fuel tank 16 by the low pressure pump 17, regulated in pressure by the low pressure regulator 19, and then multiplied in pressurized by the high pressure fuel. pump 18 to the fuel injector 14. The high pressurized fuel is partly delivered to the fuel injector 14 and partly returned through the return fuel line 22. The high pressure regulator 21 regulates a return fuel quantity so as to optimize the pressurized fuel in pressure level directed to the fuel injector 14.

An intake line 25 has an air cleaner 26 at the upstream end and an intake manifold at the downstream end which is independently connected to the intake ports 12 of the cylinder. An intake valve 8 is provided in each intake port 12 and an air stream control valve 30 is provided either one of the intake ports 12 only. The air stream control valve 30, which may be of an actuator operated type, causes an air stream to be admitted into the combustion chamber 6 through only the other intake port 12 while it closes, which results in forming, for example, a swirl of intake air abundant in tumble components in a direction of the vertical axis of the cylinder. The intake line 25 is provided with a heat sensing type of air-flow sensor 27, an electrically controlled throttle valve 28 and a surge tank 29 in order from the upstream end. The throttle valve 28 is not controlled directly by an accelerator pedal but indirectly by an accelerator pedal through an actuator (not shown).

An exhaust line 31 through which exhaust gas are discharged into the atmosphere is provided with an oxygen sensor (which is hereafter referred to as an $O_2$ sensor) 32, a three-way catalyst 33 and a lean NOx conversion catalyst 34 in order from the upstream end. The $O_2$ sensor 32 monitors the oxygen concentration of exhaust gas based on which an air-fuel ratio is determined and provides an output sharply changing between before and after a stoichiometric air-fuel ratio. Each of the catalysts 33 and 34 is of a type using a cordierite honeycomb block coated with a catalytic material which allows exhaust gas to flow through. The three-way catalyst significantly lowers emission levels of unburnt hydrocarbons (HC), carbon monoxide (CO) and oxides of nitrogen (NOx) while the air-fuel mixture is richer than a stoichiometric mixture and has an excellent catalytic conversion efficiency in, in particular, a window, i.e. in a region of air-fuel ratios close to the stoichiometric air-fuel ratio. The lean NOx conversion catalyst 34, on one hand, adsorbs NOx in exhaust gas while the air-fuel mixture is leaner than a stoichiometric mixture and, on the other hand, desorbs or releases NOx into exhaust gas for catalyzing reduction of NOx while the air-fuel mixture is richer than a stoichiometric mixture. This type of lean NOx conversion catalyst may be provided by coating a honeycomb block with, for example, a single catalyst layer or double catalyst layers. In the case of using a single catalyst layer, the catalyst may contain noble metals such as platinum (Pt) rhodium (Rh), palladium (Pd) and the like, an alkaline metal such as potassium (K) and the like, and an alkaline-earth metal such as barium (Ba) and the like carried as catalytic metals by alumina or ceria. In the case of using double catalyst layer, a first or under catalyst layer may be comprised of platinum (Pt) and an alkaline-earth metal such as barium (Ba) and the like carried as catalytic metals by alumina or ceria, and a second or over catalyst layer is comprised of a noble metal such as platinum (Pt) and the like carried as a catalytic metal by zeolite. The three-way catalyst 33 and the lean NOx conversion catalyst 34 may be replaced in position with each other. Further, when employing one of the double catalyst layer types for the lean NOx conversion catalyst 34, the three-way catalyst 33 is not always installed.

An exhaust gas recirculation (EGR) system 37 is provided to admit exhaust gas partly into the intake line 25. The exhaust gas recirculation (EGR) system 37 has a recirculation line extending from the exhaust line 31 upstream the $O_2$ sensor 32 to the intake line 25 between the throttle valve 28 and the surge tank 29, and an electrically operated exhaust gas recirculation (EGR) valve 39 installed to the recirculation line 38 in a position close to the intake line 25. The amount of exhaust gas that is recirculated through the recirculation line 38 can be controlled by the EGR valve 39. This EGR valve 39 is designed to admit carefully controlled amounts of exhaust gas into the intake air stream.

Operation of the ignition circuit 11, the fuel injector 14, the high pressure regulator 21, the actuator of the throttle valve 28, the air stream control valve 30, the EGR valve and other electrically operated elements are controlled by a control unit 41 comprising a microcomputer MC. Various signals are transferred to the control unit 41 from at least the air-flow sensor 27, the $O_2$ sensor 32, an accelerator position sensor 42 which detects accelerator positions as engine loading, a crank angle sensor 43 which monitors angles of rotation of a crankshaft 7 of the engine as an engine speed of rotation, a temperature sensor 44 which monitors the temperature of engine cooling water to determine whether the engine 1 is in a cold condition, under a warming up, or in a warm condition, a position sensor (not shown) incorporated in the EGR valve 39 which monitors a valve lift of the EGR valve 39, and an engine starter (not shown). The fuel injector 14 is pulsed to open by energizing a solenoid according to a pulse width. The control unit 41 constantly monitors engine speed, load, throttle position, exhaust, temperature, etc to control the pulse width.

Figure 2:
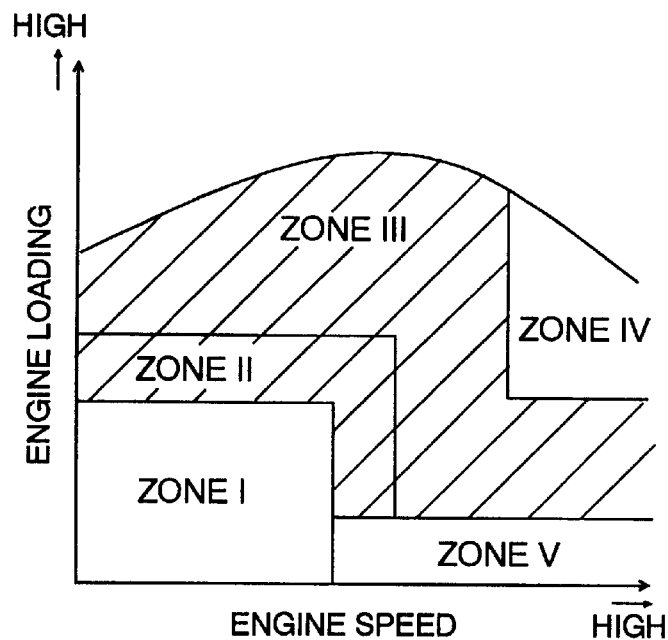
FIG. 2 is a diagram illustrating a map of fuel injection control zones for warm engine operation.
Figure 3:
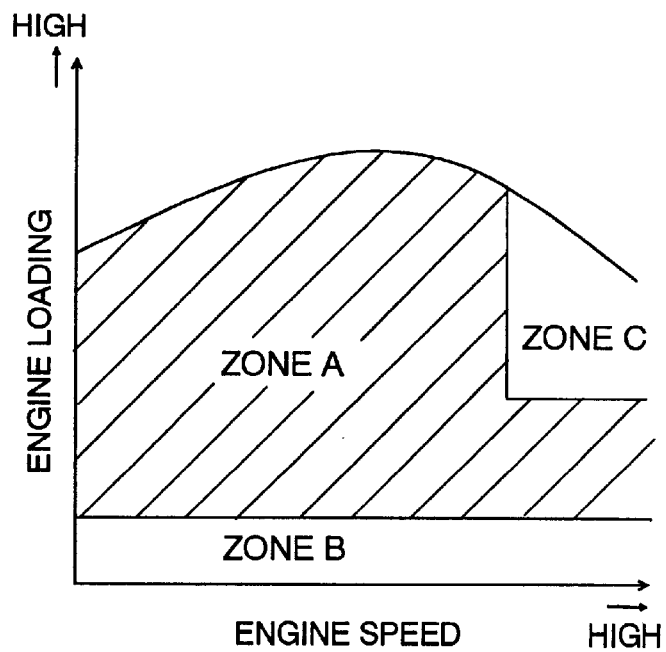
FIG. 3 is a diagram illustrating a map of fuel injection control zones for warm engine operation.
Figure 4:
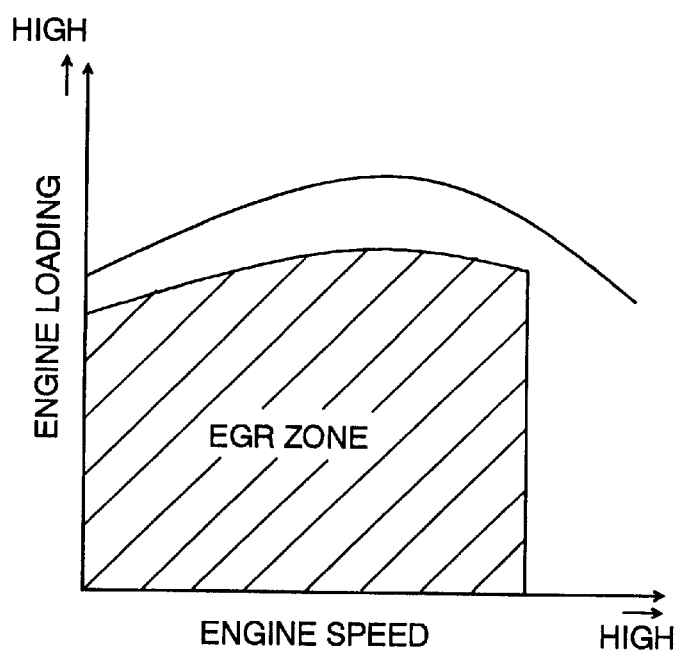
FIG. 4 is a diagram illustrating a map of exhaust gas recirculation control zone.
Figure 5A:
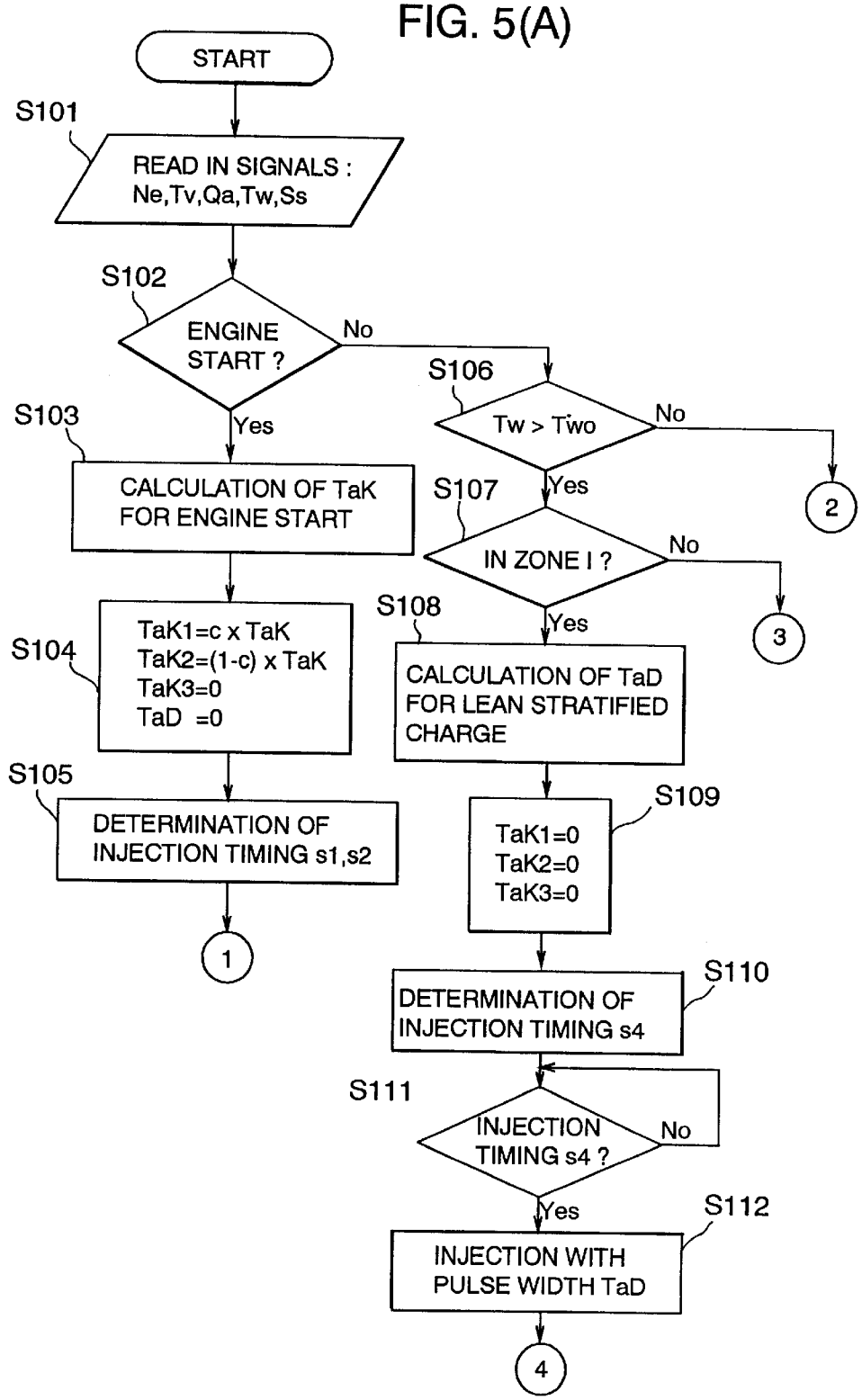
Figure 5B:
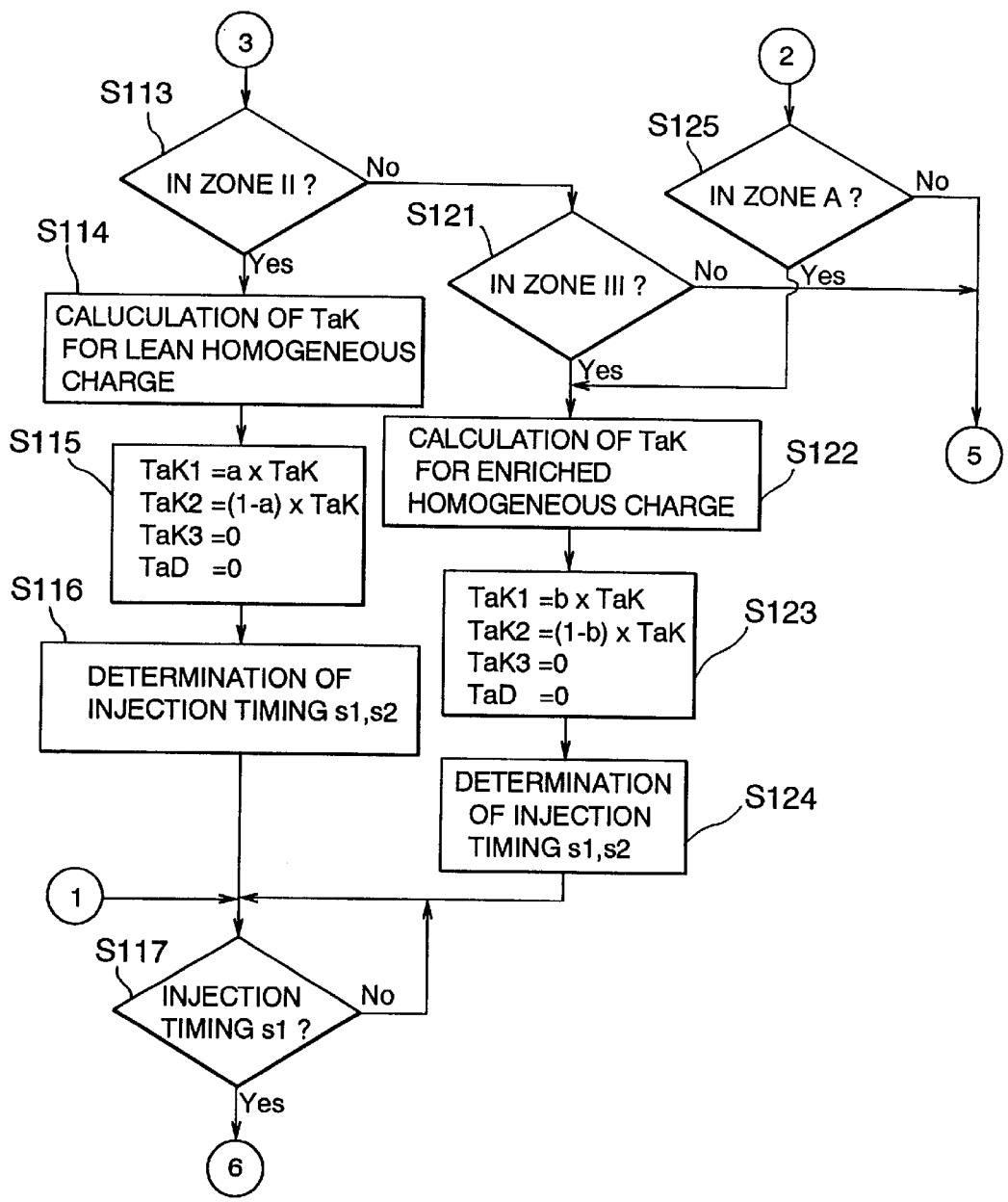

FIGS. 2 and 3 show fuel charge control maps with engine speed and loading as parameters for warm engine operations and cold engine operations, respectively, which define a lean fuel charge zone in which the engine is charged with an air-fuel mixture of $\lambda>1$ and an enriched fuel charge zone in which the engine is charged with an air-fuel mixture of $\lambda<1$ and, in another aspect, a non-split injection zone in which a given amount of fuel is delivered all at once and a split injection zone in which a given amount of fuel is delivered through in two steps or through two split injection. Specifically, the fuel charge control map shown in FIG. 2 used while the engine is in a warm condition defines five engine control zones, namely a lean stratified charge zone (I), a lean homogeneous charge zone (II), and an enriched homogeneous charge zones (III)–(V). In the lean stratified charge zone (I) which is defined for lower engine loadings and lower to middle engine speeds, a given amount of fuel is sprayed all at once to cause lean stratified charge combustion at an ignition timing at which the spark plug 10 is fired in a compression stroke. In the lean homogeneous charge zone (II) which is defined for lower to middle engine loadings and lower to middle engine speeds, a given amount of fuel is split into two parts and sprayed in two steps in a intake stroke to cause lean homogeneous charge combustion. In the enriched homogeneous charge zone (III) which is defined for higher engine loadings and higher engine speeds, a given amount of fuel is split into two parts and sprayed in two steps in a intake stroke to cause enriched homogeneous charge combustion. In the enriched homogeneous charge zone (IV) which is defined for higher engine loadings and higher engine speeds, a given amount of fuel is sprayed all at once in a intake stroke to cause enriched homogeneous charge combustion. In the enriched homogeneous charge zone (V) which is defined for lower engine loadings and middle to higher engine speeds, a given amount of fuel is sprayed all at once in a intake stroke to cause enriched homogeneous charge combustion. All these zones (I)–(V) are established so as not to overlap one another. The fuel charge control map shown in FIG. 3 used while the engine is in a cold condition defines three enriched homogeneous charge zones (A), (B) and (C). In the enriched homogeneous charge zone (A) which is defined for middle to higher engine loadings and lower to higher engine speeds, a given amount of fuel is split into two parts and sprayed in two steps in a intake stroke to cause enriched homogeneous charge combustion. In both enriched homogeneous charge zone (B) which is defined for lower engine loadings and lower to higher engine speeds and enriched homogeneous charge zone (C) which is defined for higher engine loadings and higher engine speeds, a given amount of fuel is sprayed all at once in a intake stroke to cause enriched homogeneous charge combustion. These three zones (A)–(C) are established so as not to overlap one another. While the engine operates in any one of the engine control zones (II), (III) and (A) shaded in FIGS. 2 and 3 in which split injection is made in a intake stroke, the EGR system 37 is actuated to admit amounts of exhaust gas controlled by the EGR valve 39 into the intake air stream. An exhaust gas recirculation (EGR) rate, which is a rate of the amount of exhaust gas that is recirculated relative to the amount of exhaust gas that is produced resulting from combustion varies according to engine speed and loading. As will be described later, is set to 20 to 40% in this embodiment, which is significantly large as compared with the prior art EGR systems. As shown in FIG. 4, an EGR zone may be defined as shaded. The EGR zone covers the lean stratified charge zone (I), the lean homogeneous charge zone (II) and the enriched homogeneous charge zone (III) excepting a higher engine loading region for warm conditions, and the enriched homogeneous charge zone (A) excepting a higher engine loading region for cold conditions.

FIGS. 5(A) through 5(D) show a flow chart illustrating a sequence routine of fuel charge control.

As shown, when the flow chart logic commences and control proceeds directly to a function block at step S101 where signals Ne, Tv, Qa, Tw and Ss representative of various control factors such as engine speed, accelerator position, intake air quantity, cooling water temperature and a starter signal, respectively, are read into the control unit 41. Subsequently, a decision is made at step S102 as to whether the engine 1 starts. When there is an occurrence of a starter signal Ss and the engine speed Ne is lower than a specified speed, an engine start is ascertained. When the answer is affirmative, an injection pulse width TaK at the engine start is calculated at step S103. The given amount of fuel is divided into two parts for early split injection and late split injection made in an intake stroke according to a split ratio represented by a split factor c (1>0). For this purpose, the injection pulse width TaK is divided into two split injection pulse widths TaK1 which is expressed by c×TaK and TaK2 which is expressed by (1−c)×TaK at step S104. At the beginning of engine operation, a given amount of fuel is neither sprayed in non-split intake stroke injection nor in non-split compression stroke injection, and simultaneously both non-split intake stroke injection pulse width TaK3 and non-spilt compression stroke injection pulse width TaD are set to 0 (zero). Thereafter, split injection timings s1 and s2 for the early and late split injection are determined, respectively, at step S105. As shown by (b) in FIG. 6, the early and late split injection timings s1 and s2 are predetermined. That is, the early split injection timing s1 for the early split injection is dictated by an angle of rotation of the crankshaft 7 in an early half of a intake stroke and, more specifically, at a crank angle 45 to 50 degrees before top-dead-center in a intake stroke, and the late split injection is timed to start at a point s2 in a later half of the intake stroke and, more specifically, at a crank angle 100 to 120 degrees after top-dead-center in the intake stroke. After the determination of early and late split injection timings s1 and s2 at step S105, a decision is made at step S117 as to whether it is the early split injection timing si for the early split injection. After waiting up to the early split injection timing s1 at step S117, the fuel injector 14 is pulsed to open to deliver the amount of fuel depending upon the early split injection pulse width TaK1 at step S118. Similarly, a decision is subsequently made at step 119 as to whether it is the late split injection timing s2 for the late split injection. After waiting up to the late split injection timing s2 at step S119, the fuel injector 14 is pulsed to open to deliver the amount of fuel depending upon the late split injection pulse width TaK2 at step S120. After a conclusion of the late split injection at step S120, the flow chart logic returns to restart the sequence routine.

On the other hand, when the answer to the decision as to engine start made at step S102 is negative, another decision is made at step S106 as to whether the cooling water temperature Tw is higher than a specified value Two, i.e. whether the engine 1 is in a warm condition. When the answer is affirmative, then, still another decision is made at step S107 as to whether the engine operating condition is in the lean stratified charge zone (I) for lower engine loadings and middle to higher engine speeds of the fuel charge control map for warm engine operation shown in FIG. 2. When the engine operating condition, or the engine loading and speed, is in the lean stratified charge zone (I), a non-split compression stroke injection pulse width TaD for the lean stratified charge combustion is calculated at step S108. In the lean stratified charge zone (I), neither split injection nor non-split intake stroke injection is made, both split injection pulse widths TaK1 and Tak2 and non-split intake stroke injection pulse width TaK3 are set to 0 (zero) at step S109. Thereafter, a non-split compression stroke injection timing s3 is determined at step S110. As shown by (a) in FIG. 6, the non-split compression stroke injection timing s3 is predetermined. That is, the non-split compression stroke injection timing s3 is set in a later half of a compression stroke. Subsequently, a decision is made at step S111 as to whether it is the injection timing s3 for the non-split compression stroke injection. After waiting up to the non-split compression stroke injection timing s3 at step S111, the fuel injector 14 is pulsed to open to deliver the amount of fuel depending upon the non-split compression stroke injection width TaD at step S112. After a conclusion of the non-split compression stroke injection, the flow chart logic returns to restart the sequence routine.

When the answer to the decision as to engine operating condition made at step S107 is negative, another decision is subsequently made at step S113 as to whether the engine operating condition is in the lean homogeneous charge zone (II) for lower engine loadings and lower to middle engine speeds of the fuel charge control map for warm engine operation shown in FIG. 2. When the engine operating condition, or the engine loading and speed, is in the lean homogeneous charge zone (II), an injection pulse width TaK for lean homogeneous charge combustion is calculated at step S114. The given amount of fuel is divided into two parts for early and late split injection made in a intake stroke according to a split ratio represented by a split factor a (1>0) at step S115. The injection pulse width TaK is divided into an early split injection pulse width TaK1 which is expressed by a×TaK and a late split injection pulse width TaK2 which is expressed by (1−a)×TaK. In the lean homogeneous charge zone (II) the given amount of fuel is neither sprayed in non-split intake stroke injection nor in non-split compression stroke injection and consequently both non-split intake stroke injection pulse width TaK3 and non-spilt compression stroke injection pulse width TaD are set to 0 (zero). Thereafter, early and late split injection timings s1 and s2 are determined as shown by (b) in FIG. 6 at step S116, After waiting up to the early split injection timing s1 at step S117, the fuel injector 14 is pulsed to open to deliver the amount of fuel depending upon the early split injection pulse width TaK1 at step S118. Similarly, after waiting up to the late split injection timing s2 at step S119, the fuel injector 14 is pulsed to open to deliver the amount of fuel depending upon the late split injection pulse width TaK2 at step S120. After a conclusion of the late split injection at step S120, the flow chart logic returns to restart the sequence routine.

When the engine operating condition is out of the lean homogeneous charge zone (II), another decision is subsequently made at step S121 as to whether the engine operating condition is in the enriched homogeneous charge zone (III) for middle to higher engine loadings and lower to higher engine speeds of the fuel charge control map for warm engine operation shown in FIG. 2. When the engine operating condition, or the engine loading and speed, is in the enriched homogeneous charge zone (III), an injection pulse width TaK for enriched homogeneous charge combustion is calculated at step S122. The given amount of fuel is divided into two parts for the early and late split injection made in a intake stroke according to a split ratio represented by a split factor b (1>0) at step S123. The injection pulse width TaK is divided into an early split injection pulse width TaK1 which is expressed by b×TaK and a late split injection pulse width TaK2 which is expressed by (1−b)×TaK. In the enriched homogeneous charge zone (III) the given amount of fuel is sprayed neither in non-split intake stroke injection nor in non-split compression stroke injection and consequently both non-split intake stroke injection pulse width TaK3 and non-spilt compression stroke injection pulse width TaD are set to 0 (zero). In the same manner as in the lean homogeneous charge zone (II), early and late split injection timings s1 and s2 are determined as shown by (b) in FIG. 6 at step S124. After waiting up to the early split injection timing s1 at step S117, the fuel injector 14 is pulsed to open to deliver the amount of fuel depending upon the early split injection pulse width TaK1 at step S118. Similarly, after waiting up to the late split injection timing s2 at step S119, the fuel injector 14 is pulsed to open to deliver the amount of fuel depending upon the late split injection pulse width TaK2 at step S120. After a conclusion of the late split injection at step S120, the flow chart logic returns to restart the sequence routine.

When the answer to the decision as to the enriched homogeneous charge combustion is negative, this indicates that the engine operating condition is in either the enriched homogeneous charge zone (IV) for higher engine loadings and higher engine speeds or the enriched homogeneous charge zone (V) for lower engine loadings and middle to higher engine speeds, then, an injection pulse width TaK for enriched homogeneous charge combustion is calculated at step S126. In the zone (IV) or (V), the given amount of fuel is sprayed all at once in a intake stroke, the injection pulse width TaK is employed as a non-split intake stroke injection pulse width TaK3 at step S127. Simultaneously, both split injection pulse widths Tak1 and Tak2 and non-split compression stroke injection pulse width TaD are set to 0 (zero). Thereafter, a non-split intake stroke injection timing s4 is determined at step S128. As shown by (c) in FIG. 6, the non-split intake stroke injection timing s4 is predetermined. That is, the non-split intake stroke injection timing s4 is set such that the non-split intake stroke injection is started at approximately the midpoint of a intake stroke. Subsequently, after waiting up to the non-split intake stroke injection timing s4 at step S129, the fuel injector 14 is pulsed to open to deliver the amount of fuel depending upon the non-split intake stroke injection width TaK3 at step S130. After a conclusion of the non-split intake stroke injection, the flow chart logic returns to restart the sequence routine.

Further, when the answer to the decision as to cooling water temperature Tw made at step S106 is negative, this indicates that the engine 1 is still in a cold condition, then, another decision is subsequently made at step S125 as to whether the engine operating condition is in the enriched homogeneous charge zone (A) for middle to middle to higher engine loadings of the fuel charge control map for cold engine operation shown in FIG. 3. When the engine operating condition, or the engine loading and speed, is in the enriched homogeneous charge zone (A), steps S122–S124 and S117 through S120 are taken to cause early and late split infection in a intake stroke to deliver the given amounts of fuel depending upon the early and late split injection pulse widths TaK1 and TaK2.

On the other hand, when the answer to the decision as to engine operating condition made at step S125 is negative, this indicates that the engine operating condition is either the enriched homogeneous charge zone (B) for lower engine loadings or the enriched homogeneous charge zone (C) for higher engine loadings and higher engine speeds, then, a given amount of fuel is sprayed in non-split intake stroke injection. An injection pulse width TaK for enriched homogeneous charge combustion is calculated at step S126 and is employed as a non-split intake stroke injection pulse width TaK3 at step S127. Simultaneously, both split injection pulse widths Tak1 and Tak2 and non-split compression stroke injection pulse width TaD are set to 0 (zero). After waiting up to the non-split intake stroke injection timing s4 at step S129, the fuel injector 14 is pulsed to open to deliver the amount of fuel depending upon the non-split intake stroke injection width TaK3 at step S130. After a conclusion of the non-split intake stroke injection, the flow chart logic returns to restart the sequence routine.

In the engine operation control system according to the above embodiment, the midpoint m between the early and late split injection timings s1 and s2 is positioned before the midpoint of a intake stroke which is at a crank angle 90 degrees after top-dead-center. Each injection pulse split factor a, b, c is set approximately 0.5, which divides a given amount of fuel into two exact halves for early and late split injection.

In operation of the engine control system according to the above embodiment of the invention, immediately after an engine start, a given amount of fuel is divided into two parts and sprayed through early and late split injection in a intake stroke as shown by (c) in FIG. 6. During idling after the engine start, while the engine 1 is monitored to be still in a cold condition in which the cooling water temperature Tw is lower than the specified value Two and in the enriched homogeneous charge zone (B) for lower engine loadings or the enriched homogeneous charge zone (C) for higher engine loadings and higher engine speeds, a given amount of fuel is sprayed all at once in a intake stroke as shown by (c) in FIG. 6. Further, during in cold engine operation, when the engine 1 operates in the enriched homogeneous charge zone (A) for middle to higher engine loadings, a given amount of fuel is divided into two parts and sprayed through early and late split injection in a intake stroke as shown by (b) in FIG. 6.

After the cooling water temperature Tw reaches the specified value Two, or during in warm engine operation, a given amount of fuel is divided into two parts and sprayed through early and late split injection in a intake stroke as shown by (b) in FIG. 6 when the engine 1 operates in the lean homogeneous charge zone (II) for lower to middle engine loadings and lower to middle engine speeds or in the enriched homogeneous charge zone (III) for middle to higher engine loadings. On the other hand, a given amount of fuel is sprayed all at once in a compression stroke as shown by (a) in FIG. 6 when the engine 1 operates in the lean stratified homogeneous charge zone (1) for lower engine loadings and lower to middle engine speeds or in a intake stroke as shown by (c) in FIG. 6 when the engine 1 operates in the enriched homogeneous charge zone (IV) for higher engine loadings and higher engine speeds or in the enriched homogeneous charge zone (V) for lower engine loadings and middle to higher engine speeds. Further, while the engine operates in the zone in which a given amount of fuel is sprayed through early and late split injection in a intake stroke, i.e. in any one of the enriched homogeneous charge zone (A), the lean homogeneous charge zone (II) and the enriched homogeneous charge zone (III), the EGR valve 39 is actuated to admit exhaust gas in the exhaust line 31 partly into an intake air stream in the intake line 25. Practically, the exhaust gas recirculation (EGR) rate is significantly low while the engine operates with higher loadings in the enriched homogeneous charge zone (A) and the enriched homogeneous charge zone (III). The EGR valve 39 may be shut in the higher loading zone as shown in FIG. 4.

When a given amount of fuel is divided into two parts and sprayed in two steps through early and late split injection in a intake stroke, the part of fuel sprayed through the early split injection is homogeneously diffused in the combustion chamber 6 with an increase in volume of the combustion chamber 6 following a down stroke of the piston 5 before the late split injection. Subsequently, the part of fuel splayed through the late split injection is diffused, so as to provide a homogeneous distribution of air-fuel mixture in the entire combustion chamber 6. That is, the split injection provides a homogeneous distribution of air-fuel mixture in the entire combustion chamber 6 without enhancing penetrating force of a spray of fuel. The early and late split injection which is shifted as one whole a little to the early side of a intake stroke prevents or significantly reduces sticking of sprayed fuel through the late split injection to the side wall of the cylinder bore 2 when the piston 5 reaches near bottom-dead-center or at the end of a intake stroke, which is always desirable for a homogeneous distribution of fuel in the combustion chamber 6. In particular, sprayed fuel moderated in penetrating force through the split injection prevents sprayed fuel from sticking to the side wall of the cylinder bore 2. Furthermore, there is provided a long time before fuel ignition for which fuel is allowed to be sprayed and evaporate, and recirculated exhaust gas raises the temperature of air introduced into the intake line 28 with an effect of warming a spray of fuel, so that fuel evaporation is even more accelerated. The air stream control valve 30 is actuated to admit intake air into the combustion chamber 6 through one of the intake ports 12 only with an effect of producing a swirl of intake air which causes an accelerated homogeneous distribution of fuel and accelerated evaporation of fuel in the combustion chamber 6. The mutually potentiating effect of the acceleration of a homogeneous distribution of fuel and evaporation of fuel provides a big raise in combustion velocity, so as to improve specific fuel consumption due to a reduction in combustion time and increase combustion stability of the engine 1.

In order to empirically demonstrate the extent of the improvement of combustion stability, measurements of combustion stability and changes in specific fuel consumption of an engine were made in such a manner that, while a given amount of fuel was divided into two approximately equal parts for early and late split injection, the early split injection was fixed at a point s1 an early stage of a intake stroke and the late split injection was timed to start at a point s2 changing in a period of time lying between a intake stroke and a subsequent compression stroke. The result of measurements is shown in FIGS. 7(A) and 7(B).

Figures 7A, 7B:
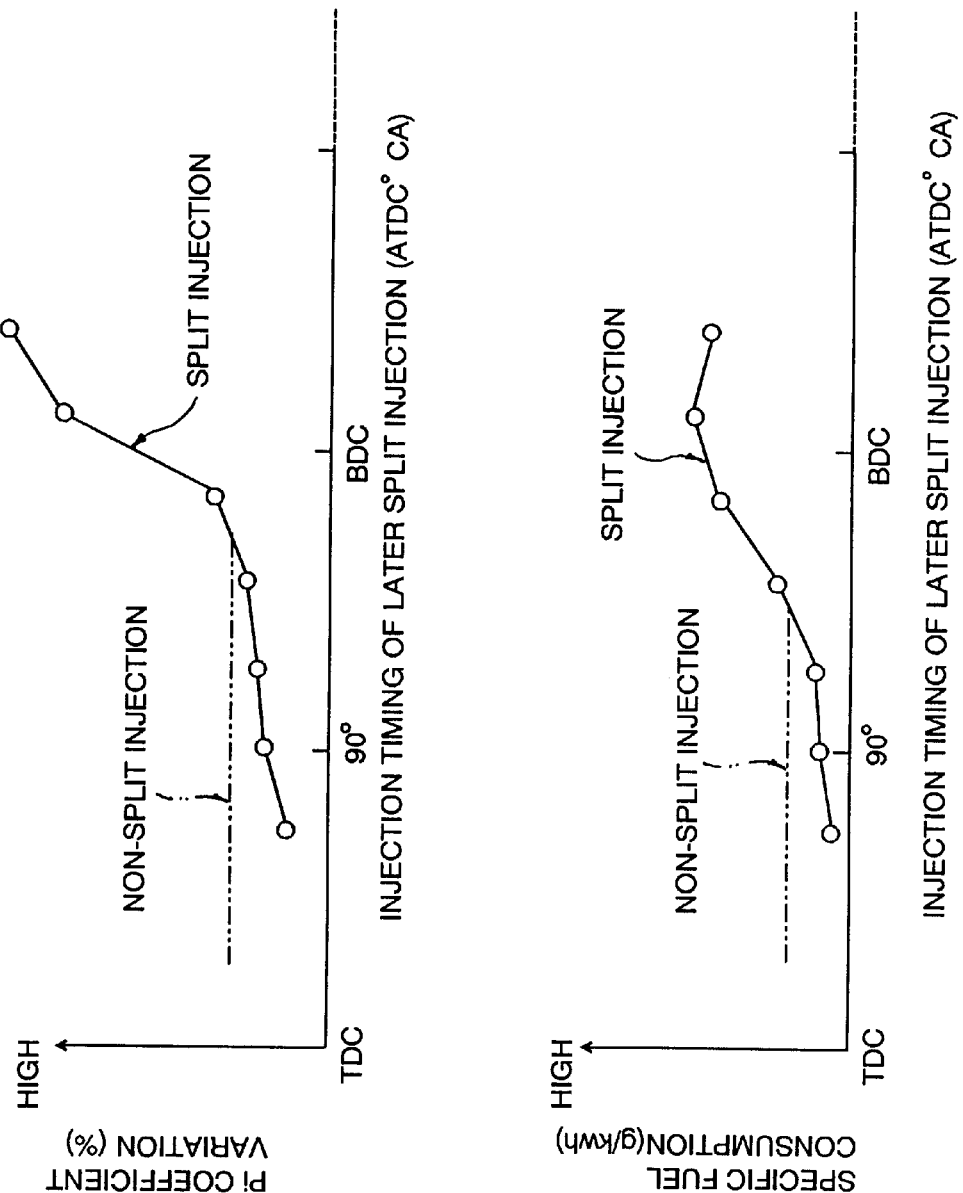
FIGS. 7(A) and 7(B) are graphs illustrating Pi coefficient variation and specific fuel consumption respectively with respect to later fuel injection timing.

Referring to FIG. 7(A) showing the coefficient variation of indicated mean effective pressure (Pi coefficient variation), it is proved that, as the early split injection timing s1 is advanced, the Pi coefficient variation and the specific fuel consumption lower. In ore detail, when the early split injection is timed to start at a point s1 before reaching a crank angle of 120° after top-dead center, i.e. at a point in an early-to-middle division of a intake stroke, both Pi coefficient variation and specific fuel consumption are reduced more as compared to the case where a given amount of fuel is sprayed through non-split injection. The Pi coefficient variation and the specific fuel consumption are reduced greatly as the late split injection timing s2 is advanced. Accordingly, in a zone where the given amount of fuel, and hence a injection pulse width, is small such as, for example, low loading and low speed engine operating zones, the Pi coefficient variation and the specific fuel consumption are reduced even more greatly when the late split injection is advanced so as to end before an crank angle of 120° after top-dead center.

As shown by (b) in FIG. 8, when the midpoint of a late split injection period is put at a point, for example at a crank angle of 86° after top-dead center, where the piston 5 attains the highest lowering speed before the midpoint M of a intake stroke, the late split injection is made in a condition where the piston 5 moves down with the highest speed with an effect of causing an intake air stream to enter with the highest speed, a spray of fuel through the late split injection is homogeneously distributed in the combustion chamber 6 by the intake air stream, which provides the improvement of combustion stability and specific fuel consumption. In this instance, the timing of early split injection s1 is fixed at crank angle of 20° after top-dead center, and the timing of late split injection s2 is fixed at crank angle of 70° after top-dead center.

Figure 9:
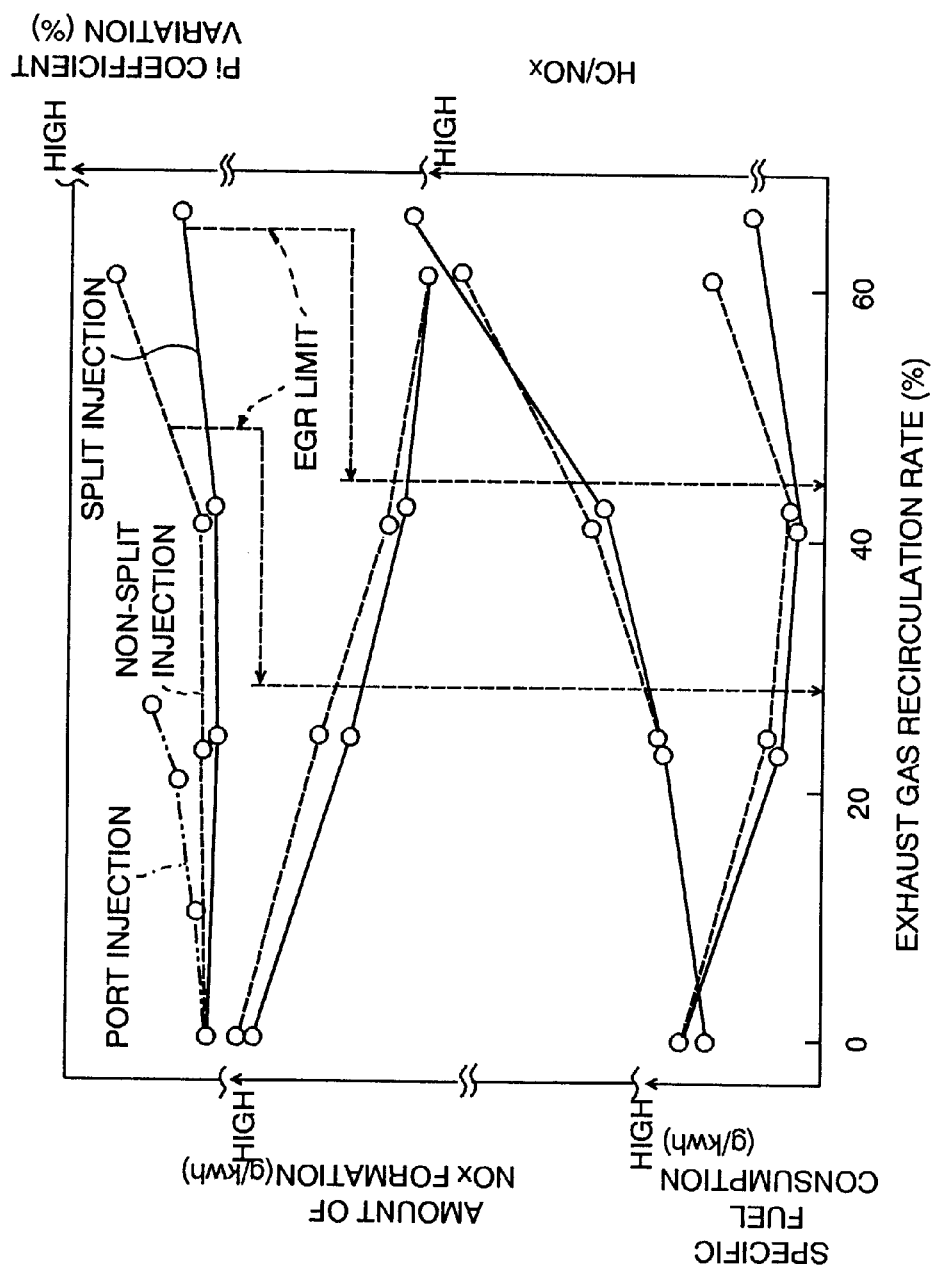
FIG. 9 is a graphical illustration showing the amount of NOx formation, specific fuel consumption, Pi coefficient variation and HC concentration ratio with respect to exhaust gas recirculation ratio.

According to the embodiment, the significantly great improvement of combustion stability yields an increase in the amount of recirculated exhaust gas which is significantly large as compared to the prior art fuel charge control. In order to prove the improvement of Pi coefficient variation according to the split injection control of the invention, measurements of the Pi coefficient variation following a change in exhaust gas recirculation (EGR) rate changing from 0 to 60% were made as to the case where the engine 1 was operated with a stoichiometric mixture. The result is shown together with the Pi coefficient variation resulting from non-split injection control in FIG. 9. As apparent, it is proved that an increase in Pi coefficient variation is made significantly greater by split injection than by non-split injection or by port fuel injection. In more detail, in the case of port fuel injection where a given amount of fuel is delivered all at once into an intake port, the upper limit of exhaust gas recirculation (EGR) rate is approximately 20% or slightly higher. If the upper limit of exhaust gas recirculation (EGR) rate is exceeded, the engine 1 encounters variations of combustion in excess, which always causes sharp aggravation of drivability. For this reason, when considering fluctuations in the amount of practically recirculated exhaust gas due to a delay in operation of the EGR valve 39, the upper limit of exhaust gas recirculation (EGR) rate has to be set between approximately 10 and 15%. In the case where the engine 1 is of a direct injection-spark ignition type in which fuel is sprayed directly into the combustion chamber 6, the non-split injection expands the upper limit of exhaust gas recirculation (EGR) rate as high as 40% or higher, it is permitted to set the exhaust gas recirculation (EGR) rate to approximately 25%. The early and late split injection expand the upper limit of exhaust gas recirculation (EGR) rate to higher than 60%. It is permitted to set the exhaust gas recirculation (EGR) rate to approximately 40% even taking account of practical fluctuations in the amount of recirculated exhaust gas. While for exhaust gas recirculation (EGR) rates less than 40%, the specific fuel consumption is decreased due to an increase in the amount of exhaust gas admitted into the intake air stream which is accompanied by a decrease in pumping loss of the engine 1 and for exhaust gas recirculation (EGR) rates greater than 40%, there occurs aggravation of combustion, which is always accompanied by aggravation of specific fuel consumption. The emission level of NOx is gradually lowered, but sharply as the amount of recirculated exhaust gas increases in the extent of exhaust gas recirculation (EGR) rates between 0 and 40%.

According to the embodiment described above, in the lean homogeneous zone (II) for lower to middle engine loadings and lower to middle engine speeds, while the combustion stability of the engine 1 is significantly improved by the split injection control, the improvement of specific fuel consumption and a significant reduction in the amount of NOx formation are realized by controlling the EGR valve 39 so as to admit exhaust gas with an exhaust gas recirculation (EGR) rate higher than 20%, for example with a maximum exhaust gas recirculation (EGR) rate of 40%. Similarly, in the enriched homogeneous zone (III) for middle to higher engine loadings, the improvement of specific fuel consumption and a significant reduction in the amount of NOx formation are realized by performing the split injection control and recirculating exhaust gas with an exhaust gas recirculation (EGR) rate higher than 20%, for example with a maximum exhaust gas recirculation (EGR) rate of 40%.

Figure 10:
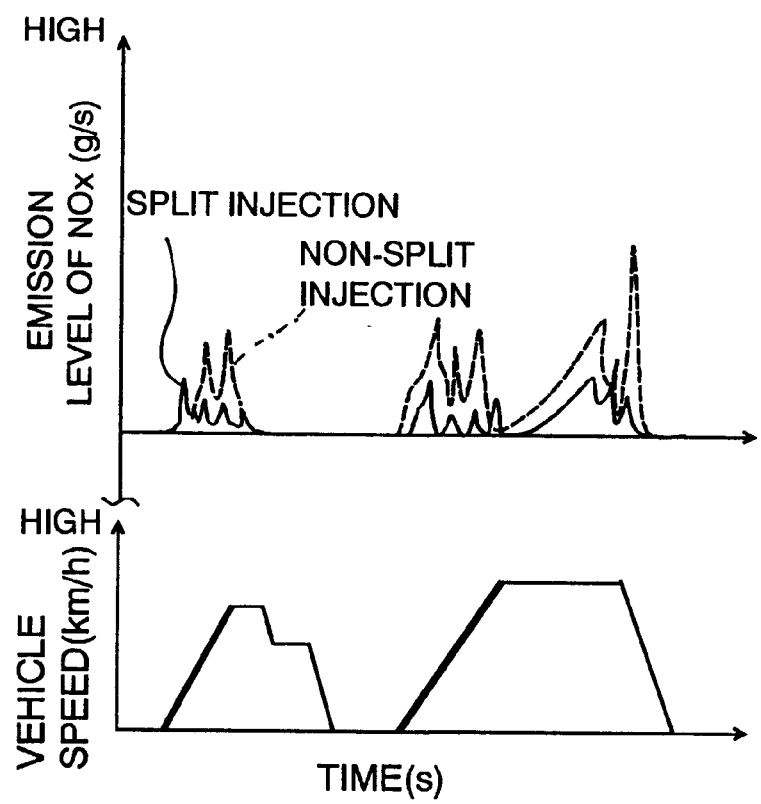
FIG. 10 is a graphical illustration showing the emission level of NOx with respect to vehicle speed.

FIG. 10 shows the amount of NOx formation relative to vehicle speed as a result of actual running tests of a vehicle on which the engine 1 equipped with the fuel charge control system of the invention was mounted. In FIG. 10, the amount of NOx formation resulting from non-split injection is shown by a solid line and the amount of NOx formation resulting from split injection is shown by a broken line. In the tests, the split injection is made together with the exhaust gas recirculation only in the enriched homogeneous charge zone (III) during acceleration. The vehicle used in the tests was equipped with a double layered NOx conversion catalyst which has a NOx adsorption catalytic layer and a layer of catalyzing reduction of NOx in the exhaust line.

As shown in FIG. 10, it is proved that, while the vehicle is under acceleration as indicated by thick sections of a line, the amount of NOx formation is more significantly lowered when a given amount of fuel is delivered through early and late split injection together with recirculating a large amount of exhaust gas than when the given amount of fuel is delivered all at once through non-split injection. After second acceleration of the vehicle, although the lean NOx conversion catalyst 34 experiences a rise in temperature following a rise in exhaust gas temperature due to high speed running of the vehicle and allows a rise in the emission level of NOx, however, since, in the case of executing the split injection, the lean NOx conversion catalyst 34 is sufficiently refreshed due to acceleration prior to the high speed running, the emission level of NOx is lowered more as compared to the case of executing the non-split injection.

Figure 11:
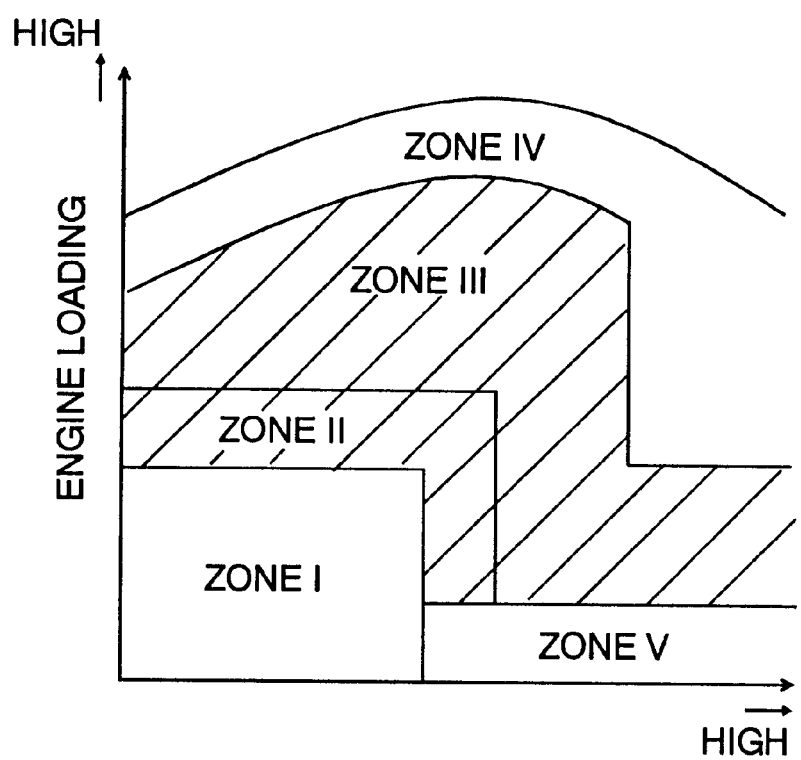
FIG. 11 is a diagram illustrating a variation of the map of fuel injection control zones for warm engine operation shown in FIG. 2.

FIG. 11 show a fuel charge control map for cold engine operation which is similar to that shown in FIG. 2 but has an enriched homogeneous charge zone (IV) is expanded above an enriched homogeneous charge zone (III). When using the fuel charge control map in the fuel charge control shown in FIGS. 5(A) through 5(D), the exhaust gas recirculation control is executed while the engine operates in the EGR zone shown in FIG. 4 which covers the lean stratified charge zone (I), the lean homogeneous charge zone (II) and the enriched homogeneous charge zone (III).

Figure 12:
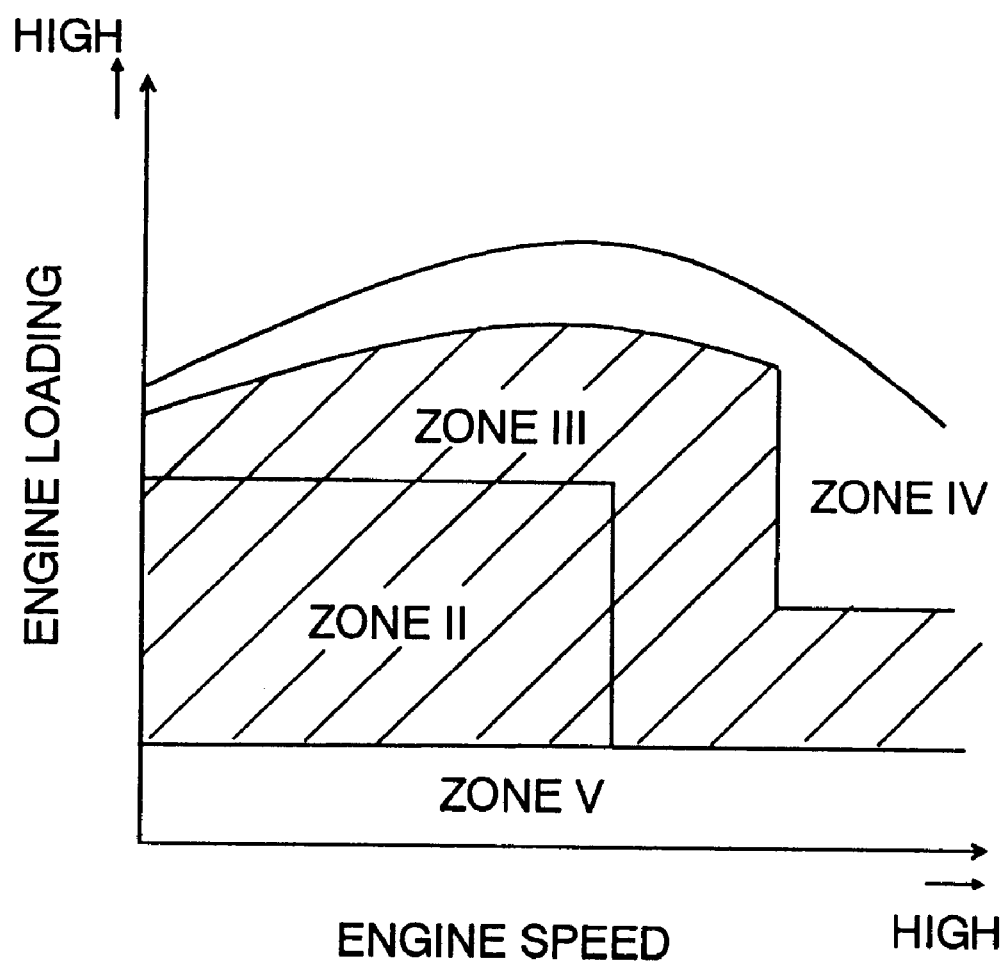
FIG. 12 is a diagram illustrating another variation of the map of fuel injection control zones for warm engine operation shown in FIG. 2.

FIG. 12 show a fuel charge control map for cold engine operation which is suitably used for fuel charge control of a direct injection-spark ignition engine of a type which does not have stratified charge combustion feature. As shown in FIG. 12, the fuel charge control map is similar to that shown in FIG. 11 but, while having no lean stratified charge zone (I), defines an enriched homogeneous charge zone (V) lying over possible engine speeds in which non-split injection is executed. This type of direct injection-spark ignition engine has no necessity of having a piston formed with a top cavity and provides a reduction in heat loss consequently.

The engine control system of the invention may be employed for engines other than what is called a lean bum engine, i.e. engines which operative with a stoichiometric fuel charge in a partial engine loading zone and with an enriched fuel charge in a full engine loading zone or engines operative with a stoichiometric fuel charge over possible engine loadings. In these cases, the specific fuel consumption and the formation of NOx are lowered by expanding the limit of exhaust gas recirculation rate. Further, such an engine may be provided with a three-way catalyst in place of a lean NOx conversion catalyst.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. An engine control system for a direct injection-spark ignition type of engine which is equipped with a fuel injector for spraying fuel directly into a combustion chamber, an intake system and an exhaust system having a lean NOx conversion catalyst for lowering an emission level of nitrogen oxides (NOx) in exhaust gas at an air-fuel ratio of $\lambda>1$ for controlling the engine to make stratified charge combustion in a zone of lower engine loadings and homogeneous charge combustion in a zone other than said lower engine loading zone, said engine control system comprising:

engine operating condition monitoring means for monitoring engine operating conditions;

exhaust gas recirculation means for recirculating exhaust gas partially into an intake air stream in said intake system; and fuel injection control means for, while said engine operating condition monitoring means monitors engine operating conditions in said zone other than said lower engine loading zone and said exhaust gas recirculation means admits exhaust gas into said intake air stream, dividing a given amount of fuel into two parts which are intermittently delivered through early and late split injection respectively in a intake stroke of said cylinder piston and controlling said fuel injector such that a midpoint between points at which said early and late split injection are timed respectively to start is before a midpoint of a intake stroke of said cylinder piston.

2. The engine control system as defined in claim 1, wherein said late split injection is timed to start at a point in one of first and middle divisions of three approximately equal divisions of a intake stroke of said cylinder piston.

3. The engine control system as defined in claim 1, wherein said exhaust gas recirculation means admits exhaust gas with an exhaust gas recirculation ratio of 10 to 40%.

4. The engine control system as defined in claim 1, and further comprising air stream control means for creating an air stream in said combustion chamber.

5. The engine control system as defined in claim 1, wherein said fuel injection is of a type having a spray angle greater than 45°.

6. The engine control system as defined in claim 1, wherein said fuel injection control means divides a given amount of fuel into two approximately equal parts for said early and late split injection.

7. An engine control system for a direct injection-spark ignition type of engine which is equipped with a fuel injector for spraying fuel directly into a combustion chamber and an exhaust system having a lean NOx conversion catalyst for lowering an emission level of nitrogen oxides (NOx) in exhaust gas at an air-fuel ratio of $\lambda>1$ for controlling the engine to operate with a fuel charge of $\lambda>1$ in a zone of partial engine loadings and with a fuel charge enriched to be $\lambda<1$ in a zone other than said partial engine loading zone, said engine control system comprising:

engine operating condition monitoring means for monitoring engine operating conditions;

exhaust gas recirculation means for recirculating exhaust gas partially into an intake air stream in said intake system; and fuel injection control means for, while said exhaust gas recirculation means admits exhaust gas into said intake air stream, dividing a given amount of fuel into two parts which are intermittently delivered through early and late split injection, respectively, in a intake stroke, and controlling said fuel injector such that a midpoint between points at which said early and late split injection are timed respectively to start respectively is before a midpoint of a intake stroke.

8. The engine control system as defined in claim 7, wherein said late split injection is timed to start at a point in one of first and middle divisions of three approximately equal divisions of a intake stroke of said cylinder piston.

9. The engine control system as defined in claim 8, wherein said late split injection is timed to end at a point in one of first and middle divisions of three approximately equal divisions of a intake stroke of said cylinder piston while the engine is in a lower speed zone.

10. The engine control system as defined in claim 9, wherein a midpoint of said late split injection is timed to be at a point before said midpoint of a intake stroke of said cylinder piston at which said cylinder piston attains a maximum down speed.

11. The engine control system as defined in claim 8, wherein a midpoint of said late split injection is timed to be at a point before said midpoint of a intake stroke of said cylinder piston at which said cylinder piston attains a maximum down speed.

12. The engine control system as defined in claim 7, wherein said exhaust gas recirculation means admits exhaust gas with an exhaust gas recirculation ratio of 10 to 40%.

13. The engine control system as defined in claim 7, and further comprising air stream control means for creating an air stream in said combustion chamber.

14. The engine control system as defined in claim 7, wherein said fuel injection is of a type having a spray angle greater than 45°.

15. The engine control system as defined in claim 7, wherein said fuel injection control means divides a given amount of fuel into two approximately equal parts for said early and late split injection.

16. An engine control system for a direct injection-spark ignition type of engine which is equipped with a fuel injector for spraying fuel directly into a combustion chamber for controlling an amount of fuel delivered through said fuel injector, said engine control system comprising:

engine operating condition monitoring means for monitoring engine operating conditions;

exhaust gas recirculation means for recirculating exhaust gas partially into an intake air stream in said intake system; and fuel injection control means for, while said exhaust gas recirculation means admits exhaust gas into said intake air stream, dividing said given amount of fuel into two parts which are intermittently delivered through early and late split injection respectively in a intake stroke and controlling said fuel injector such that a midpoint between points at which said early and late split injection are timed respectively to start respectively is before a midpoint of a intake stroke.

17. The engine control system as defined in claim 16, wherein said exhaust gas recirculation mean admits exhaust gas into said intake air stream while the engine is monitored to be in an engine loading zone excepting middle to higher engine loadings.

18. The engine control system as defined in claim 16, wherein said late split injection is timed to start at a point in one of first and middle divisions of three approximately equal divisions of a intake stroke of said cylinder piston.

19. The engine control system as defined in claim 18, wherein a midpoint of said late split injection is timed to be at a point before said midpoint of a intake stroke of said cylinder piston at which said cylinder piston attains a maximum down speed.

20. The engine control system as defined in claim 16, wherein said exhaust gas recirculation means admits exhaust gas with an exhaust gas recirculation ratio of 10 to 40%.

21. The engine control system as defined in claim 16, and further comprising air stream control means for creating an air stream in said combustion chamber.

22. The engine control system as defined in claim 16, wherein said fuel injection is of a type having a spray angle greater than 45°.

23. The engine control system as defined in claim 16, wherein said fuel injection control means divides a given amount of fuel into two approximately equal parts for said early and late split injection.

* * * * *